United States Patent
Heisel

(10) Patent No.: US 9,663,108 B2
(45) Date of Patent: May 30, 2017

(54) METHOD AND APPARATUS FOR CONTROLLING CREEP TORQUE IN A HYBRID POWERTRAIN SYSTEM

(71) Applicant: GM GLOBAL TECHNOLOGY OPERATIONS LLC, Detroit, MI (US)

(72) Inventor: Adam J. Heisel, Garden City, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/153,254

(22) Filed: Jan. 13, 2014

(65) Prior Publication Data

US 2015/0197250 A1 Jul. 16, 2015

(51) Int. Cl.
- *B60W 10/08* (2006.01)
- *B60W 30/18* (2012.01)
- *B60W 20/10* (2016.01)

(52) U.S. Cl.
CPC ...... *B60W 30/18063* (2013.01); *B60W 20/10* (2013.01); *B60W 30/18036* (2013.01); *B60W 2520/06* (2013.01); *B60W 2520/10* (2013.01); *B60W 2540/10* (2013.01); *B60W 2540/12* (2013.01); *B60W 2720/30* (2013.01); *Y10T 477/817* (2015.01)

(58) Field of Classification Search
CPC .......... B60W 30/18063; B60W 20/10; B60W 30/18036; B60W 2520/06; B60W 2540/10; B60W 2720/30; B60W 2520/10; B60W 2540/12; Y10T 477/817
See application file for complete search history.

(56) References Cited

U.S. PATENT DOCUMENTS

| | | | |
|---|---|---|---|
| 7,627,415 B2* | 12/2009 | Tschernoster et al. ......... 701/96 |
| 2002/0117339 A1* | 8/2002 | Nakashima ............... B60K 6/48 180/65.25 |
| 2004/0166989 A1* | 8/2004 | Carlsson ......................... 477/92 |
| 2004/0204285 A1* | 10/2004 | Ueno ............................... 477/4 |
| 2013/0245866 A1* | 9/2013 | Kuretake .................. B60L 7/10 701/22 |
| 2014/0365094 A1* | 12/2014 | Cunningham et al. ......... 701/68 |

* cited by examiner

*Primary Examiner* — Ramya Burgess
*Assistant Examiner* — Lillian Nguyen

(57) ABSTRACT

A method for operating a powertrain system of a vehicle includes determining an initial creep torque command in an operator-selected direction of travel, adjusting the initial creep torque command responsive to an operator braking request and responsive to a change in direction of vehicle speed relative to the operator-selected direction of travel, and operating the hybrid powertrain to generate axle torque in response to the adjusted creep torque command.

4 Claims, 3 Drawing Sheets

METHOD AND APPARATUS FOR CONTROLLING CREEP TORQUE IN A HYBRID POWERTRAIN SYSTEM

TECHNICAL FIELD

This disclosure is related to control systems for hybrid powertrain systems.

BACKGROUND

The statements in this section merely provide background information related to the present disclosure. Accordingly, such statements are not intended to constitute an admission of prior art.

Powertrain architectures for vehicles include hybrid powertrain systems that employ multiple torque-generative devices including internal combustion engines and non-combustion torque machines that transmit mechanical torque either directly or via a transmission device to a driveline for use as propulsion torque. Known internal combustion engines can also generate torque which may be transmitted to a torque machine to generate power that is storable as potential energy in an on-board storage device. Internal combustion engines include multi-cylinder heat engines that convert stored fuel to mechanical power through combustion processes, and non-combustion torque machines include multiphase electric motors that transform electric power to mechanical power. An electrical energy storage device, e.g., a battery, stores DC electrical power that can be transferred and converted to AC electric power using an inverter device to operate the multiphase electric machine to generate mechanical power to achieve work. Hybrid powertrain systems generate mechanical power that is transferred to a vehicle driveline responsive to an output torque request. Power outputs from the engine and the electric machine(s) are controlled to be responsive to the output torque request.

SUMMARY

A method for operating a powertrain system of a vehicle includes determining an initial creep torque command in an operator-selected direction of travel, adjusting the initial creep torque command responsive to an operator braking request and responsive to a change in direction of vehicle speed relative to the operator-selected direction of travel, and operating the hybrid powertrain to generate axle torque in response to the adjusted creep torque command.

BRIEF DESCRIPTION OF THE DRAWINGS

One or more embodiments will now be described, by way of example, with reference to the accompanying drawings, in which:

FIGS. 2-1 and 2-2 illustrate an axle creep torque control routine for controlling the hybrid powertrain system of FIG. 1, in accordance with the disclosure;

DETAILED DESCRIPTION

Figure 1:
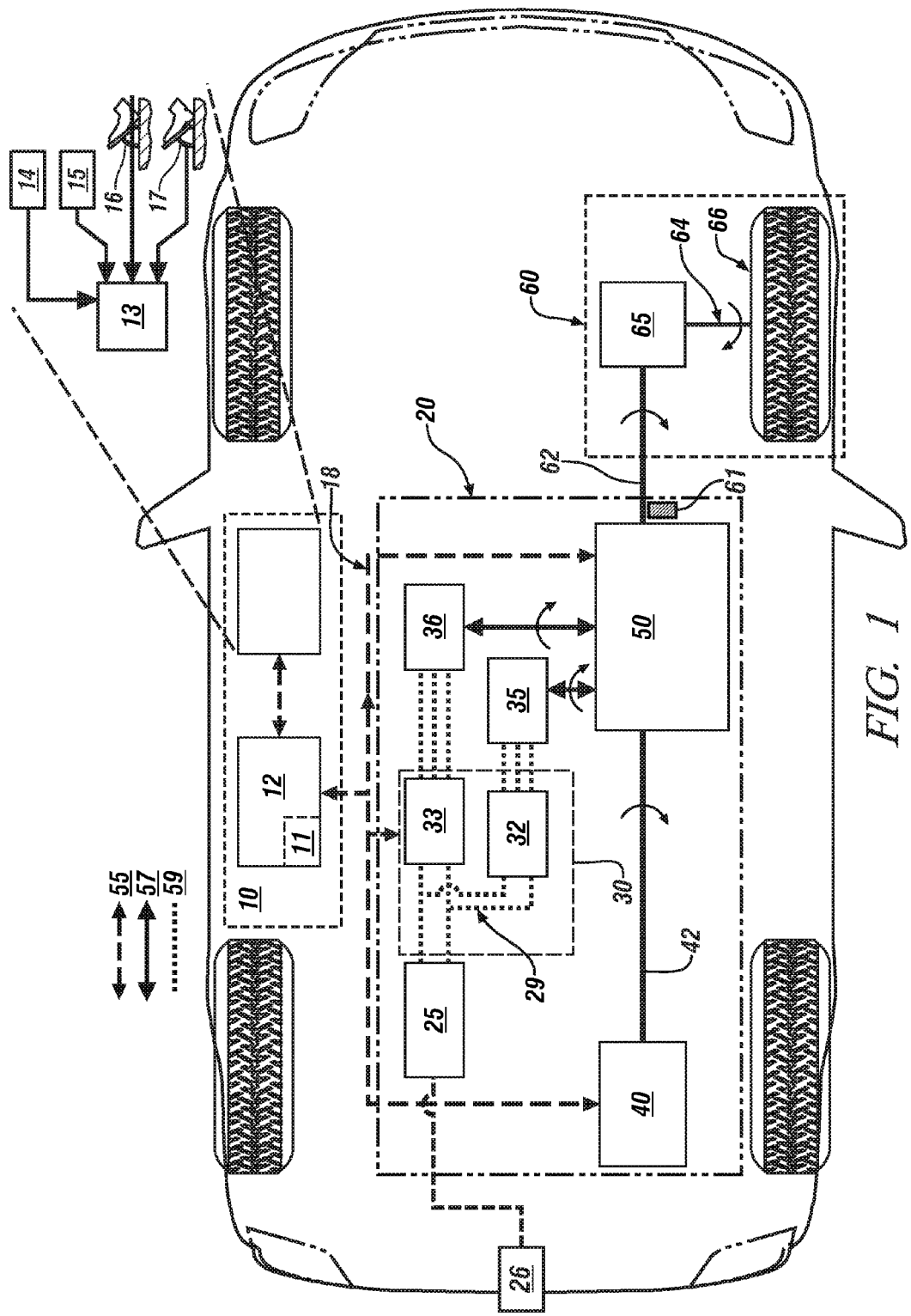
FIG. 1 illustrates a vehicle including an exemplary hybrid powertrain system coupled to a driveline and controlled by a control system, in accordance with the disclosure.

Referring now to the drawings, wherein the showings are for the purpose of illustrating certain exemplary embodiments only and not for the purpose of limiting the same, FIG. 1 schematically illustrates a vehicle including an embodiment of a hybrid powertrain system 20 coupled to a driveline 60 and controlled by a control system 10. The exemplary vehicle is configured as a hybrid-electric vehicle employing an internal combustion engine (engine) 40, transmission 50 and first and second electrically-powered torque machines 35 and 36, respectively. Other hybrid-electric powertrain configurations are within the scope of this disclosure, including a powertrain configuration that includes a single electrically-powered torque machine arranged in series with the engine and transmission, and other powertrain systems that monitor rotational direction and speed of an output member of the powertrain system. Like numerals refer to like elements throughout the description.

The vehicle may be configured to operate in one of an electric vehicle (EV) mode and a hybrid vehicle (HV) mode. Operating the vehicle in the EV mode includes generating all propulsion torque from one or more of the torque machines 35, 36 driven by electric power. Operating the vehicle in the HV mode includes generating the propulsion torque from the engine 40 and the first and second torque machines 35, 36. The engine 40 may execute autostart and autostop control schemes during operation in the HV mode. The HV mode may include one or more operating states wherein all the propulsion torque is generated by the engine 40.

The hybrid powertrain system 20 employs communications paths 55, mechanical power paths 57, and high-voltage electric power paths 59. The mechanical power paths 57 mechanically couple elements that generate, use, and/or transfer torque, including the engine 40, the first and second torque machines 35, 36, transmission 50 and driveline 60. The high-voltage electric power paths 59 electrically connect elements that generate, use, and/or transfer high-voltage electric power, including the energy storage system 25, an inverter module 30, and the first and second torque machines 35, 36. The high-voltage electric power paths 59 include a high-voltage DC bus 29. The communications path 55 includes high-speed data transfer lines to effect communications between various elements of the vehicle, and may include one or more of a direct connection, a local area network bus, and a serial peripheral interface bus, and include a high-speed communications bus 18.

The exemplary energy storage system 25 is a high-voltage battery fabricated from a plurality of lithium-ion cells. It is appreciated that the energy storage system 25 may include a plurality of electrical cells, ultracapacitors, and other devices configured to store electric energy on-vehicle.

The engine 40 is preferably a multi-cylinder direct fuel injection internal combustion engine that converts fuel to mechanical power through a combustion process. The engine 40 is equipped with a plurality of sensing devices and actuators configured to monitor operation and deliver fuel to form a combustion charge to generate torque. The engine 40 may be configured to execute autostart and autostop control schemes and fuel cutoff (FCO) control schemes during ongoing operation of the vehicle. The engine 40 is considered to be in an OFF state when it is not being fueled and is not spinning. The engine 40 is considered to be in an FCO state when it is spinning but is not being fueled.

The first and second torque machines 35, 36 preferably include multi-phase electric motor/generators electrically connected to the inverter module 30 that are configured to convert electric energy to mechanical power and convert mechanical power to electric energy that may be stored in the energy storage system 25. The first and second torque machines 35, 36 have limitations in power outputs in the form of minimum and maximum torques and rotational speeds.

The inverter module 30 includes first and second inverters 32 and 33 that electrically connect to the first and second torque machines 35, 36, respectively. The first and second torque machines 35, 36 interact with the respective first and second inverters 32 and 33 to convert stored electric energy to mechanical power and convert mechanical power to electric energy that may be stored in the energy storage system 25. The first and second electric power inverters 32 and 33 are operative to transform high-voltage DC electric power to high-voltage AC electric power and also operative to transform high-voltage AC electric power to high-voltage DC electric power. The energy storage system 25 electrically connects via the high-voltage bus 29 to the inverter module 30 that connects to the first and second torque machines 35, 36 to transfer electric power therebetween. In one embodiment, an external connector 26 electrically connects to the energy storage system 25 and is connectable to an external AC power source to provide electric power for charging the energy storage system 25 during vehicle static periods.

The transmission 50 preferably includes one or more differential gear sets and controllable clutch components to effect torque transfer over a range of speeds between the engine 40, the first and second torque machines 35, 36, and an output member 62 that couples to the driveline 60. In one embodiment the transmission 50 is a two-mode transmission device configurable to transfer torque in one of an input-split mode and a compound-split mode. Operating parameters associated with mechanical power transfer include power between the engine 40 via the transmission 50 indicated by input torque and input speed, and power between the transmission 50 and the driveline 60 indicated by output torque and output speed. The driveline 60 may include a differential gear device 65 that mechanically couples to an axle 64 or half-shaft that mechanically couples to a ground-engaging wheel 66 in one embodiment. The wheel 66 includes a controllable friction brake that operatively couples to a brake controller. The differential gear device 65 is coupled to the output member 62 of the hybrid powertrain system 20, and transfers output power therebetween. The driveline 60 transfers propulsion power between the transmission 50 and a road surface. A vehicle speed sensor 61 is configured to monitor rotation of the output member 62 and provides data including rotational position, speed, and direction of rotation to the control system 10. The data from the vehicle speed sensor 61 is employed to determine a magnitude and direction of vehicle speed in one embodiment.

The control system 10 includes a control module 12 that signally connects to an operator interface 13. The operator interface 13 includes a plurality of human/machine interface devices through which the vehicle operator commands and controls operation of the vehicle, including an operator acceleration request via an accelerator pedal 17, an operator braking request via a brake pedal 16, a transmission range selection via a PRNDL lever 15 or another suitable device, a vehicle speed request, e.g., through a cruise control system 14, and vehicle operation control via an ignition key.

Although the control module 12 and operator interface 13 are shown as individual discrete elements, such an illustration is for ease of description. The functions described as being performed by the control module 12 may be combined into one or more devices, e.g., implemented in software, hardware, and/or application-specific integrated circuitry (ASIC) and ancillary circuits that are separate and distinct from the control module 12. Information transfer to and from the control module 12 may be accomplished using the communications paths 55, including, e.g., communications bus 18. The control module 12 preferably signally and operatively connects to individual elements of the hybrid powertrain system 20 via the communications bus 18. The control module 12 signally and/or operatively connects to the sensing devices of each of the energy storage system 25, the inverter module 30, the first and second torque machines 35, 36, the engine 40 and the transmission 50 to monitor and control operation and determine parameters thereof.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event The control module 12 executes control routines 11 to control operation of the engine 40 in coordination with the first and second torque machines 35, 36 and the transmission 50 to generate an output torque and output speed at the output member 62 to transfer mechanical power to the driveline 60 to generate axle torque in response to the operator acceleration request and the operator braking request. The axle torque is either a positive (propulsion) torque or a negative (regenerative braking) torque. One of the control routines 11 referred to herein as creep operation controls operation of the torque-generative devices, i.e., the engine 40 and the first and second torque machines 35, 36 to generate a magnitude of axle torque referred to as a creep torque, which is a magnitude of axle torque that is commanded when the operator acceleration request 17 is zero, the transmission range selection 15 is one of the drive ranges, e.g., drive (D) or reverse (R), and the vehicle speed is less than a speed threshold associated with creep operation, which is at or near 5 MPH (8 km/h) for example.

Figures 1, 2:
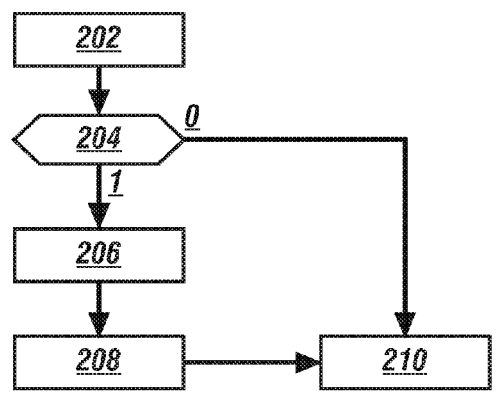
Figure 2:
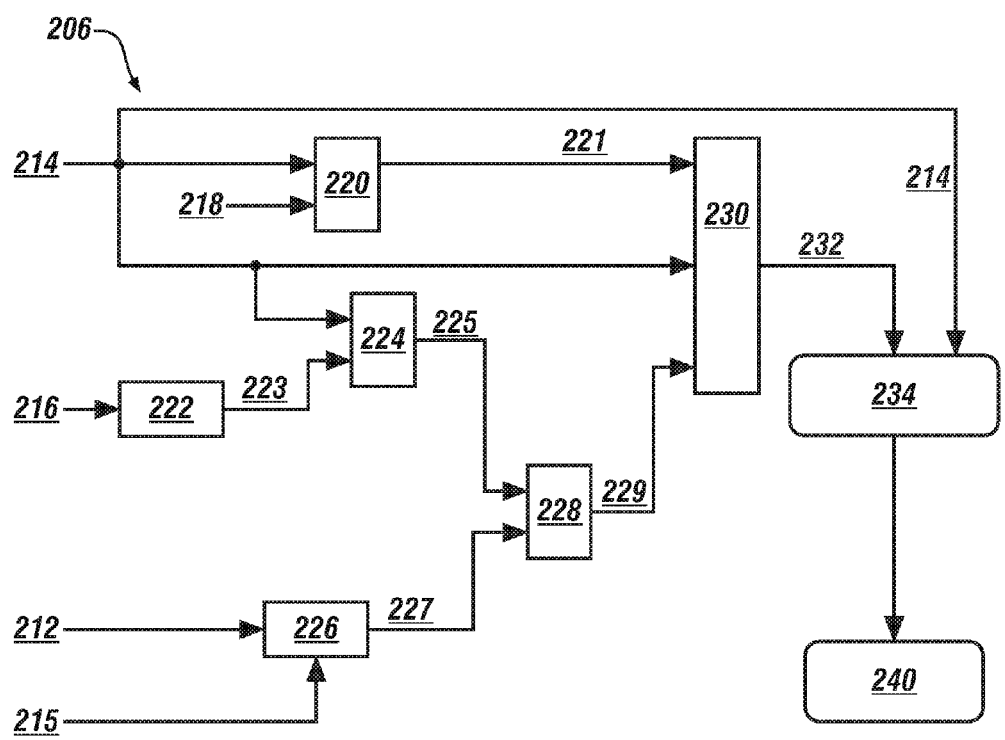

FIGS. 2-1 and 2-2 schematically illustrate an axle creep torque control routine for controlling operation of a hybrid powertrain system, e.g., as described with reference to FIG. 1. The axle creep torque control routine is employed to control a hybrid powertrain system to generate propulsion torque in a manner that achieves a magnitude of creep torque, limits vehicle rollback when operating the vehicle on an incline, and limits vehicle roll-forward acceleration when operating the vehicle on a decline, all while minimizing energy loss caused by axle torque cancellation initiated by the operator braking request. Overall, the axle creep torque control routine monitors and controls vehicle operation under conditions when the vehicle speed is less than a threshold with no operator input to the accelerator pedal, taking into account the magnitude and direction of vehicle speed in relation to a commanded and expected direction of vehicle speed. This operation permits vehicle operation that achieves a creep torque while minimizing vehicle rollback, thus minimizing need for operator braking force that works against the creep torque generated by the powertrain system. Table 1 is provided as a key to FIG. 2-1 wherein the numerically labeled blocks and the corresponding functions are set forth as follows.

TABLE 1

| BLOCK | BLOCK CONTENTS |
| --- | --- |
| 202 | Monitor magnitude and direction of Vss, Tacclr, Tbrk, PRNDL |
| 204 | Is Tacclr = 0, PRNDL = R, D, L, AND Vss less than threshold? |
| 206 | Determine preferred axle creep torque |
| 208 | Control powertrain system to achieve preferred axle creep torque |
| 210 | End |

The axle creep torque control routine periodically executes during ongoing vehicle operation. Various vehicle and operator parameters are monitored, including a magnitude and direction of vehicle speed (Vss), a transmission range selection (PRNDL), an operator acceleration request (Tacclr) and an operator braking request (Tbrk) (202). When the operator acceleration request is zero, i.e., the operator is not depressing the accelerator pedal, the vehicle speed is less than a speed threshold associated with creep operation, and the transmission range selector is in one of the drive ranges, e.g., drive (D) or reverse (R) (204)(1), an axle creep torque determination routine (206) is executed to determine a preferred axle creep torque, and operation of the powertrain system is controlled to achieve the preferred axle creep torque (208). When these conditions are not met or are no longer met (204)(0), this iteration of the axle creep torque control routine ends (210).

FIG. 2-2 schematically shows the axle creep torque determination routine 206 of FIG. 2-1, employing monitored inputs including an initial creep torque command 214, a magnitude and direction (signed) vehicle speed 212, an operator braking request 216, and a transmission range selection 215. The initial creep torque command 214 is a calibrated value for axle torque that is determined in relation to vehicle speed when the operator acceleration request is zero. The initial creep torque command 214 is a magnitude of axle torque that achieves a vehicle speed that is an order of magnitude of 5-8 km/h (3-5 mph) when the vehicle is operating on a flat surface. The signed vehicle speed 212 includes magnitude and direction of the vehicle speed. The transmission range selection 215 indicates operator-selected direction of travel, i.e., one of drive (D), reverse (R) or neutral (N).

The initial creep torque command 214 is compared to a threshold torque 218 (220) and a logic signal 221, i.e., either 0 or 1, is generated. The logic signal 221 is set equal to "1" when the initial creep torque command 214 is greater than the threshold torque 218, and the logic signal 221 is set equal to "0" when the initial creep torque command 214 is less than the threshold torque 218. The logic signal 221 is employed by a subsequent logic operator 230 to select either the initial creep torque command 214 or a second creep torque command 229 as a braking-modified creep torque command 232.

The operator braking request 216 is input to calibration table 222, which selects a first numerical multiplier 223 that is within a range between 0 and 1 (or 0% and 100%) in direct relation to the magnitude of the operator braking request 216 (0% —no braking torque request and 100% —maximum braking torque request). The first numerical multiplier 223 is employed to adjust the initial creep torque command 214 by numerical multiplication (224) to determine a braking-modified creep torque command 225. This operation decreases the magnitude of axle torque that is generated responsive to the initial creep torque command 214 in response to an increase in the operator braking request 216.

The signed vehicle speed 212 is input to calibration table 226, which selects a second numerical multiplier 227 based upon the magnitude and direction of the vehicle speed and the operator-selected direction of travel. By way of example, the second numerical multiplier 227 is set equal to 1 when the vehicle speed is zero. The second numerical multiplier 227 is set according to an inverse relationship with the minimum multiplier from calibration 222 when the vehicle speed is less than zero and the transmission range selection 215 indicates the operator-selected direction of travel is drive (D), or when the vehicle speed is greater than zero and the transmission range selection 215 indicates the operator-selected direction of travel is reverse (R). By way of example, when the minimum multiplier from calibration 222 is 0.04, the maximum value at a negative vehicle speed is 1/0.04, or 25. The second numerical multiplier 227 is set according to a pass-through relationship when the vehicle speed is greater than zero and the transmission range selection 215 indicates the operator-selected direction of travel is drive (D), or when the vehicle speed is less than zero and the transmission range selection 215 indicates the operator-selected direction of travel is reverse (R). By way of example, when the signed vehicle speed 212 is positive, the calibration table 226 provides a multiplication value of 1.0 for second numerical multiplier 227. The braking-modified creep torque command 225 is multiplied by the second numerical multiplier 227 (228) to determine the second creep torque command 229.

One of the initial creep torque command 214 and the second creep torque command 229 is selected as the braking-modified creep torque command 232 using the logic operator 230. This means that the initial creep torque command 214 is selected as the braking-modified creep torque command 232 when the initial creep torque command 214 is less than the torque threshold 218, and the second creep torque command 229 is selected as the braking-modified creep torque command 232 when the initial creep torque command 214 is greater than the torque threshold 218. The braking-modified creep torque command 232 is compared with the initial creep torque command 214 and the minimum of the two values is selected as a preferred axle creep torque command 240, which is employed to control operation of the hybrid powertrain system to generate axle torque. Operation of the hybrid powertrain system may include operation with the engine in the OFF state and the first and second torque machines controlled to achieve the preferred axle creep torque command 240.

Thus, under low speed conditions when the operator is providing no input to the accelerator pedal and the vehicle is operating on a relatively flat surface, the preferred axle creep torque command 240 is equal to or less than the initial creep torque command 214 and decreases with an increase in the operator braking request 216 so long as the vehicle is moving in the forward direction and the operator-selected direction of travel is drive (D). Under low speed conditions when the operator is providing no input to the accelerator pedal and the vehicle is stopped or rolling backwards from the operator-selected direction of travel is drive (D), the preferred axle creep torque command 240 can increase up to a magnitude equal to the initial creep torque command 214 to prevent vehicle rollback responsive to an operator braking request.

The axle creep torque determination routine 206 enables calibration flexibility to minimize required magnitude of operator input to the brake pedal and minimize applied mechanical braking torque to counteract axle creep torque when the vehicle is operating on a flat road surface during an approach to a traffic sign, thus minimizing expenditure of electric energy through the mechanical vehicle brakes during vehicle creep. The axle creep torque determination routine 206 prevents a vehicle from accelerating backwards when a brake pedal is depressed by employing the signed vehicle speed as part of the torque cancellation logic.

Figure 3:
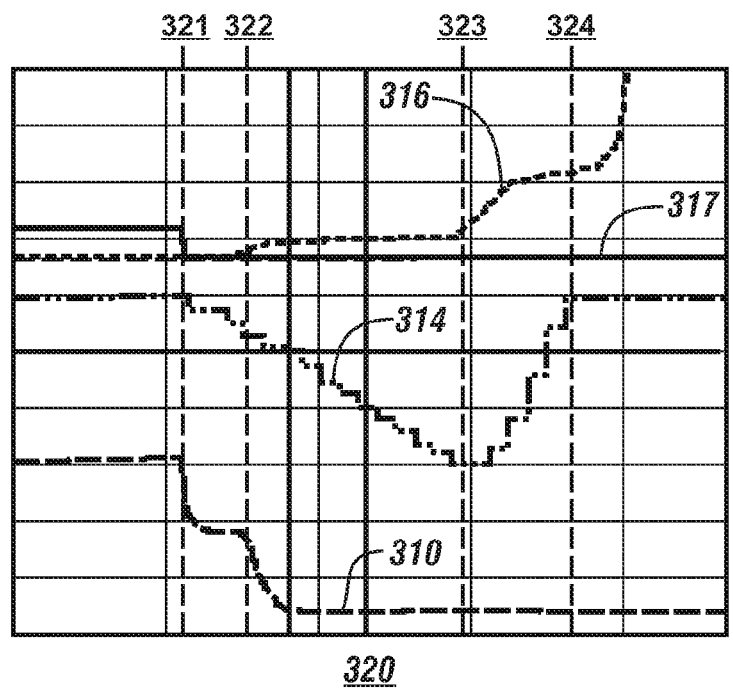
FIG. 3 illustrates operation of the exemplary hybrid powertrain system operating without benefit of the axle creep torque control routine when the vehicle is stopped or moving slowly in an uphill direction, in accordance with the disclosure.

FIG. 3 graphically shows operation of an exemplary hybrid powertrain system operating without benefit of the axle creep torque control routine when the vehicle is stopped or moving slowly in an uphill direction, such as at a stoplight. Plotted parameters include operator braking request (%) 316, operator acceleration request 317 (%), signed vehicle speed (km/h) 314, indicating both direction and magnitude of speed, and axle torque 310 (N-m), all shown on the vertical axis in relation to time 320 on the horizontal axis. At time 321, the operator acceleration request 317 falls to zero, indicating the operator has removed their foot from the accelerator pedal. The axle torque 310 decreases to achieve a commanded creep torque and the vehicle speed 314 decreases in response. At time 322, the operator braking request 316 is applied at a magnitude near 10%, thus cancelling the axle torque 310 at the commanded creep torque as indicated by the decrease in the axle torque 310. The vehicle speed 314 continues to decrease and goes negative, i.e., the vehicle reverses its direction of travel and accelerates in the reverse direction. This may be vehicle rollback, such as may occur when the vehicle is stopped at a stoplight and facing an uphill direction. At time 323, the operator braking request 316 is increased and the vehicle speed 314 (which is negative) increases towards zero, e.g., to stop vehicle rollback. The vehicle speed 314 reaches zero at time 324.

Figure 4:
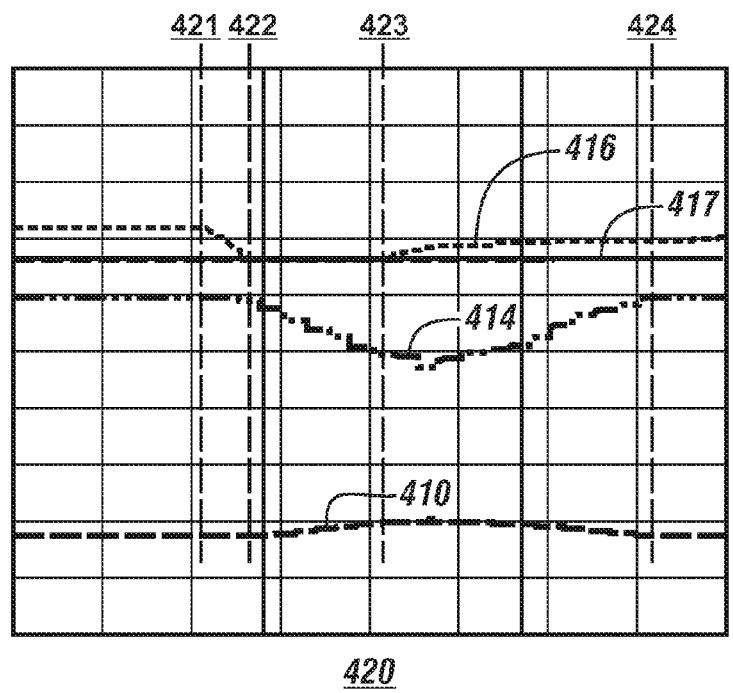
FIG. 4 illustrates operation of the exemplary hybrid powertrain system operating with the axle torque control routine in a vehicle stopped at a stoplight and facing an uphill direction, in accordance with the disclosure.

FIG. 4 graphically shows operation of the exemplary hybrid powertrain system operating with the axle creep torque control routine in a vehicle stopped at a stoplight and facing an uphill direction. Plotted parameters include operator braking request (%) 416, operator acceleration request 417 (%), signed vehicle speed (km/h) 414, indicating both direction and magnitude of speed, and axle torque 410 (N-m), all shown on the vertical axis in relation to time 420 on the horizontal axis. Prior to time 421, the operator acceleration request 417 falls to and remains at zero, indicating the operator has removed their foot from the accelerator pedal, thus initiating a request for creep torque. The operator braking request 416 is at or about 10%, and the axle torque 410 is at a commanded creep torque with the vehicle speed 414 at zero speed. The operator braking request 416 is released at time 421 and reduces to 0% at time 422, at which point the vehicle speed 414 goes negative. The axle torque 410 increases in response to the negative vehicle speed. At time 423, the operator braking request 416 increases, but does not cause cancellation of the axle torque 410, as they work in concert to stop vehicle rollback. As the vehicle speed 414 approaches zero speed, the axle torque 410 tapers off towards a magnitude that was initially occurring. The vehicle speed 414 reaches zero at time 424.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A controller-implemented method for operating a powertrain system of a vehicle, comprising:
    monitoring an initial creep torque command and an operator-selected direction of travel;
    monitoring a magnitude and a direction of vehicle speed;
    monitoring an operator braking request magnitude;
    determining a braking-modified creep torque command by adjusting the initial creep torque command through multiplication by a first multiplier ranging between 0 and 1 in direct relation to the operator braking request magnitude;
    providing a second multiplier inversely related to said first multiplier when the direction of vehicle speed is opposite the operator-selected direction of travel;
    determining a second creep torque command by adjusting the braking-modified creep torque command through multiplication by said second multiplier;
    selecting a second braking-modified creep torque command as one of the initial creep torque command and the second creep torque command based upon a comparison of the initial creep torque command with a torque threshold;
    determining a preferred axle creep torque command as the lesser of the second braking-modified creep torque command and the initial creep torque command; and
    operating the hybrid powertrain to generate axle torque that is responsive to the preferred axle creep torque command.

2. The method of claim 1, wherein operating the hybrid powertrain to generate axle torque that is responsive to the preferred axle creep torque command comprises:
    monitoring an operator acceleration request; and
    operating the powertrain responsive to the initial creep torque command in the operator-selected direction of travel when the operator acceleration request is zero and the magnitude of vehicle speed is less than a speed threshold associated with creep operation.

3. A controller-implemented method for operating a hybrid powertrain system of a vehicle, comprising:
    monitoring an initial creep torque command and an operator-selected direction of travel;
    monitoring a magnitude and a direction of vehicle speed;
    monitoring an operator braking request magnitude;
    determining a braking-modified creep torque command by adjusting the initial creep torque command through multiplication by a first multiplier ranging between 0 and 1 in direct relation to the operator braking request magnitude;

providing a second multiplier inversely related to said first multiplier when the direction of vehicle speed is opposite the operator-selected direction of travel and otherwise equal to 1 when the direction of vehicle speed is the operator-selected direction of travel;

determining a second creep torque command by adjusting the braking-modified creep torque command through multiplication by said second multiplier;

selecting a second braking-modified creep torque command as one of the initial creep torque command and the second creep torque command based upon a comparison of the initial creep torque command with a torque threshold;

operating the hybrid powertrain to generate a magnitude of axle torque that is equivalent to the initial creep torque command in the operator-selected direction of travel when the initial creep torque command is less than said torque threshold; and operating the hybrid powertrain to generate a magnitude of axle torque that is equivalent to the second braking-modified creep torque command in the operator-selected direction of travel when the initial creep torque command is greater than said torque threshold and greater than said second braking-modified creep torque command.

4. The method of claim 3, wherein the speed threshold associated with vehicle creep operation comprises a speed threshold of 8 km/h.

\* \* \* \* \*